US008458552B2

(12) United States Patent
Kang et al.

(10) Patent No.: US 8,458,552 B2
(45) Date of Patent: Jun. 4, 2013

(54) DATA PROCESSING METHOD AND APPARATUS FOR A HARQ OPERATION

(75) Inventors: Seung Hyun Kang, Anyang-si (KR); Su Nam Kim, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/386,399

(22) PCT Filed: Mar. 3, 2011

(86) PCT No.: PCT/KR2011/001473
§ 371 (c)(1),
(2), (4) Date: Jan. 20, 2012

(87) PCT Pub. No.: WO2011/108866
PCT Pub. Date: Sep. 9, 2011

(65) Prior Publication Data
US 2012/0204075 A1 Aug. 9, 2012

Related U.S. Application Data

(60) Provisional application No. 61/309,873, filed on Mar. 3, 2010.

(51) Int. Cl.
*H03M 13/00* (2006.01)
*H04L 1/18* (2006.01)

(52) U.S. Cl.
USPC ............................ 714/751; 714/749; 370/351

(58) Field of Classification Search
USPC .................... 714/749, 751; 370/351; 375/295
See application file for complete search history.

(56) References Cited

U.S. PATENT DOCUMENTS

| | | | |
|---|---|---|---|
| 2009/0052576 A1* | 2/2009 | Golitschek Edler Von Elbwart et al. | 375/298 |
| 2009/0086849 A1* | 4/2009 | Tsai et al. | 375/298 |
| 2010/0005357 A1* | 1/2010 | Sun et al. | 714/749 |
| 2010/0166103 A1* | 7/2010 | Harel et al. | 375/295 |
| 2010/0284490 A1* | 11/2010 | Kim et al. | 375/298 |

OTHER PUBLICATIONS

Samsung Electronics Co., Ltd., "Proposed Changes to Constellation Rearrangement (15.3.11.4.2)", IEEE 802.16, Broadband Wireless Access Working Group, IEEE C82.16M-09/2421, Nov. 2009.
Etri, "Proposed Text Changes of Constellation Rearrangement Related to Harq (AWD-15.3.12.2.1.1)", IEEE 802.16 Broadband Wireless Access Working Group, IEEE C802.16M-09/1257, Jul. 2009.
Z.Zhao, et al., "Enhanced Constellation Rearrangemenet for Harq With Symbol Combining", IEEE 200—Mobile Wimax Symposium, pp. 11-15, Jul. 2009.
Z. Zhao, et al., "Harq for Siso and Mimo Constellation Rearrangement", 2009 IEEE International Conference on Communications Technology and Applications, pp. 416-419, Oct. 2009.

* cited by examiner

*Primary Examiner* — Sam Rizk
(74) *Attorney, Agent, or Firm* — Lee, Hong, Degerman, Kang & Waimey

(57) ABSTRACT

A data processing method for a hybrid automatic repeat request (HARQ) is provided. Specifically, modulation can be performed according to a constellation rearrangement version (CRV) to generate a sub-packet for an incremental redundancy HARQ (IR-HARQ). When a constellation symbol modulated according to the CRV is segmented into an even symbol and an odd symbol for a plurality of transmit antennas, an identical CRV is determined for a pair of the even symbol and the odd symbol subsequent to the even symbol. When the constellation symbol modulated according to the CRV is transmitted to a receiving side, a newly generated sub-packet is retransmitted upon receiving a non-acknowledgement (NACK) signal.

11 Claims, 19 Drawing Sheets

DATA PROCESSING METHOD AND APPARATUS FOR A HARQ OPERATION

CROSS-REFERENCE TO RELATED APPLICATIONS

This application is the National Stage filing under 35 U.S.C. 371 of International Application No. PCT/KR2011/001473, filed on Mar. 3, 2011, which claims the benefit of U.S. Provisional Application Ser. No. 61/309,873, filed on Mar. 3, 2010, the contents of which are all incorporated by reference herein in their entirety.

TECHNICAL FIELD

The present invention relates to a hybrid automatic repeat request (HARQ) scheme, and more particularly, to a method and apparatus for generating a sub-packet for an HARQ.

BACKGROUND ART

A hybrid automatic repeat request (HARQ) scheme will be described. The HARQ scheme is a combination of a forward error correction (FEC) scheme and an automatic repeat request (ARQ) scheme. According to the HARQ scheme, it is determined whether an unrecoverable error is included in data received by a physical layer, and retransmission is requested upon detecting the error, thereby improving performance.

A receiver using the HARQ scheme basically attempts error correction on the received data, and determines whether the data will be retransmitted or not by using an error detection code. Various codes can be used as the error detection code. For example, when using a cyclic redundancy check (CRC), upon detection of an error of the received data in a CRC detection process, the receiver transmits a non-acknowledgement (NACK) signal to a transmitter. Upon receiving the NACK signal, the transmitter transmits relevant retransmission data according to an HARQ mode. The receiver receives the retransmission data and then performs decoding by combining the retransmission data with previous data. As a result, reception performance is improved.

The HARQ mode can be classified into a chase combining mode and an incremental redundancy (IR) mode. In the chase combining mode, to obtain a signal-to-noise ratio (SNR), error-detected data is combined with retransmitted data instead of discarding the error-detected data. In the IR mode, additional redundant information is incrementally transmitted with retransmitted data to reduce an overhead resulted from retransmission and to obtain a coding gain.

SUMMARY OF INVENTION

Technical Problem

The present invention provides a method and apparatus for improving the conventional hybrid automatic repeat request (HARQ) scheme. For example, in case of transmitting a sub-packet for which a constellation mapping scheme is differently determined in accordance with a non-acknowledgement (NACK) signal, an additional gain can be obtained by optimizing an arrangement of a constellation symbol included in the sub-packet. An HARQ method and apparatus capable of obtaining an additional gain in comparison with the conventional HARQ scheme will be provided hereinafter according to exemplary embodiments of the present invention.

Technical Solution

According to one aspect of the proposed method, a data processing method for a hybrid automatic repeat request (HARQ) performed by a mobile station or a base station is provided. The method includes: obtaining coded bits corresponding to data to be transmitted; generating a sub-packet including a constellation symbol which has undergone constellation mapping according to a constellation rearrangement version with respect to a bit selected from the coded bits on the basis of a starting point; and transmitting a signal corresponding to the sub-packet, wherein $CRV_{j,k}$ is a constellation rearrangement version of a $j^{th}$ constellation symbol included in a $k^{th}$ forward error correction (FEC) block including the sub-packet, and is defined as $$CRV_{j,k} = \left( CRV_{starting,k} + \left\lfloor \frac{\left\lfloor \frac{P_{i,k}/N_{mod}}{K_{RS}} \right\rfloor \cdot K_{RS} + n}{N_{FB\_Buffer,k}/N_{mod}} \right\rfloor \right) \mod 2,$$

where
$\lfloor \bullet \rfloor$ denotes a floor function, mod denotes a modulo operation, $CRV_{starting,k}$ denotes a starting value for the constellation rearrangement version,
$P_{i,k}$ denotes the starting point, $N_{mod}$ denotes a modulation order, and
$N_{FB\_Buffer,k}$ denotes a buffer size for the $k^{th}$ FEC block, and wherein n is defined as $$n = \left( N_{QAM,k} - \left\lfloor \frac{SPID}{K_{RS}} \right\rfloor \cdot K_{RS} + j \right) \mod N_{QAM,k},$$

where $N_{QAM,k}$ denotes the number of constellation symbols included in the $k^{th}$ FEC block, i and SPID denote an identifier (ID) of the sub-packet, and $K_{RS}$ denotes a value which is set to 1 when the number of multiple input multiple output (MIMO) streams for the signal is 1, and otherwise is set to 2.

In the aforementioned aspect of the present invention, $P_{i,k}$ may indicate a starting position of the sub-packet.

In addition, the starting point may be determined by a sub-packet ID (SPID) of the sub-packet.

In addition, the constellation rearrangement version may be set to "1" or "0", and a starting value of the constellation rearrangement version may be set to "1" or "0".

In addition, the constellation symbol may be a 16-quadrature amplitude modulation (QAM) symbol or a 64-QAM symbol.

In addition, the method may further include generating a new sub-packet on the basis of a changed SPID.

In addition, if the number of MIMO streams is greater than or equal to '2', the constellation symbol is divided into an even symbol and an odd symbol, and a constellation mapping scheme applied to the even symbol is different form a constellation mapping scheme applied to the odd symbol.

In addition, the constellation rearrangement version may be determined equally for the first constellation symbol and a second constellation symbol subsequent to the first constellation symbol, and the first constellation symbol may be the even symbol and the second constellation symbol may be the odd symbol.

In addition, the number of constellation symbols included in one sub-packet may be set to an even number.

In addition, the HARQ may be an incremental redundancy HARQ (IR-HARQ).

In addition, the constellation rearrangement version may be changed whenever a wraparound occurs at an end of a circular buffer for the SPID.

According to another aspect of the present invention, a data processing method for an HARQ performed by a mobile station or a base station is provided. The method includes: obtaining coded bits corresponding to data to be transmitted; generating a sub-packet including a constellation symbol which has undergone constellation mapping according to a constellation rearrangement version with respect to a bit selected from the coded bits on the basis of a starting point; and transmitting a signal corresponding to the sub-packet, wherein the constellation symbol is segmented into an even symbol and an odd symbol, and the constellation rearrangement version is determined equally for one symbol pair constituted in an order of the even symbol and the odd symbol. Specifically, when the number of MIMO streams exceeds 1, the constellation symbol may be segmented into an even symbol and an odd symbol.

In the aforementioned aspect of the present invention, the starting point may be determined by an SPID of the sub-packet.

In addition, the number of constellation symbols included in one sub-packet may be set to an even number.

Advantageous Effects

According to exemplary embodiments of the present invention, an arrangement of a constellation symbol included in a sub-packet is optimized to obtain an additional gain in comparison with the conventional scheme.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advanced (LTE-A) is an evolution of 3GPP LTE. Although the following description will focus on the IEEE 802.16m for clarity of explanation, the technical features of the present invention are not limited thereto.

Figure 1:
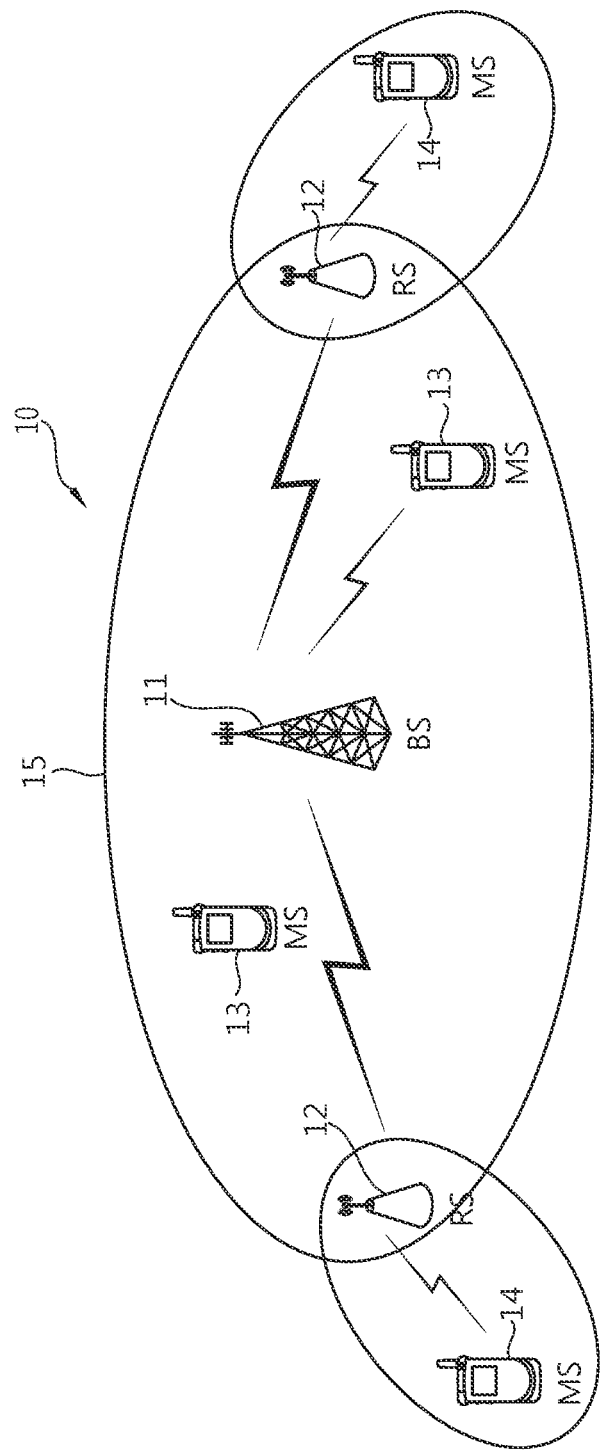
FIG. 1 shows a wireless communication system according to an embodiment of the present invention.

FIG. 1 shows a wireless communication system according to an embodiment of the present invention. Referring to FIG. 1, a wireless communication system 10 employing a relay station (RS) 12 includes at least one base station (BS) 11. Each BS 11 provides a communication service to a specific geographical region 15 generally referred to as a cell. The cell can be divided into a plurality of regions, and each, region can be referred to as a sector. One or more cells may exist in the coverage of one BS. One or more BSs may exist in one cell. The BS 11 is generally a fixed station that communicates with a mobile station (MS) 13 and may be referred to as another terminology, such as an evolved node-B (eNB), a base transceiver system (BTS), an access point, an access network (AN), an advanced BS (ABS), etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The MSs 13 and 14 may be fixed or mobile, and may be referred to as another terminology, such as a an advanced mobile station (AMS), a user terminal (UT), a subscriber station (SS), a wireless device, a personal digital assistant (PDA), a wireless modem, a handheld device, an access terminal (AT), a user equipment (UE), etc. Hereinafter, a macro MS denotes an MS that directly communicates with the BS 11, and a relay MS denotes an MS that communicates with the RS. To improve a data transfer rate depending on a diversity effect, the macro MS 13 located in the cell of the BS 11 can also communicate with the BS 11 via the RS 12.

Between the BS and the macro MS, a downlink (DL) denotes communication from the BS to the macro MS, and an uplink (UL) denotes communication from the macro MS to the BS. Between the BS and the RS, a DL denotes communication from the BS to the RS, and an UL denotes communication from the RS to the BS. Between the RS and the relay MS, a DL denotes communication from the RS to the relay MS, and a UL denotes communication from the relay MS to the RS.

Figure 2:
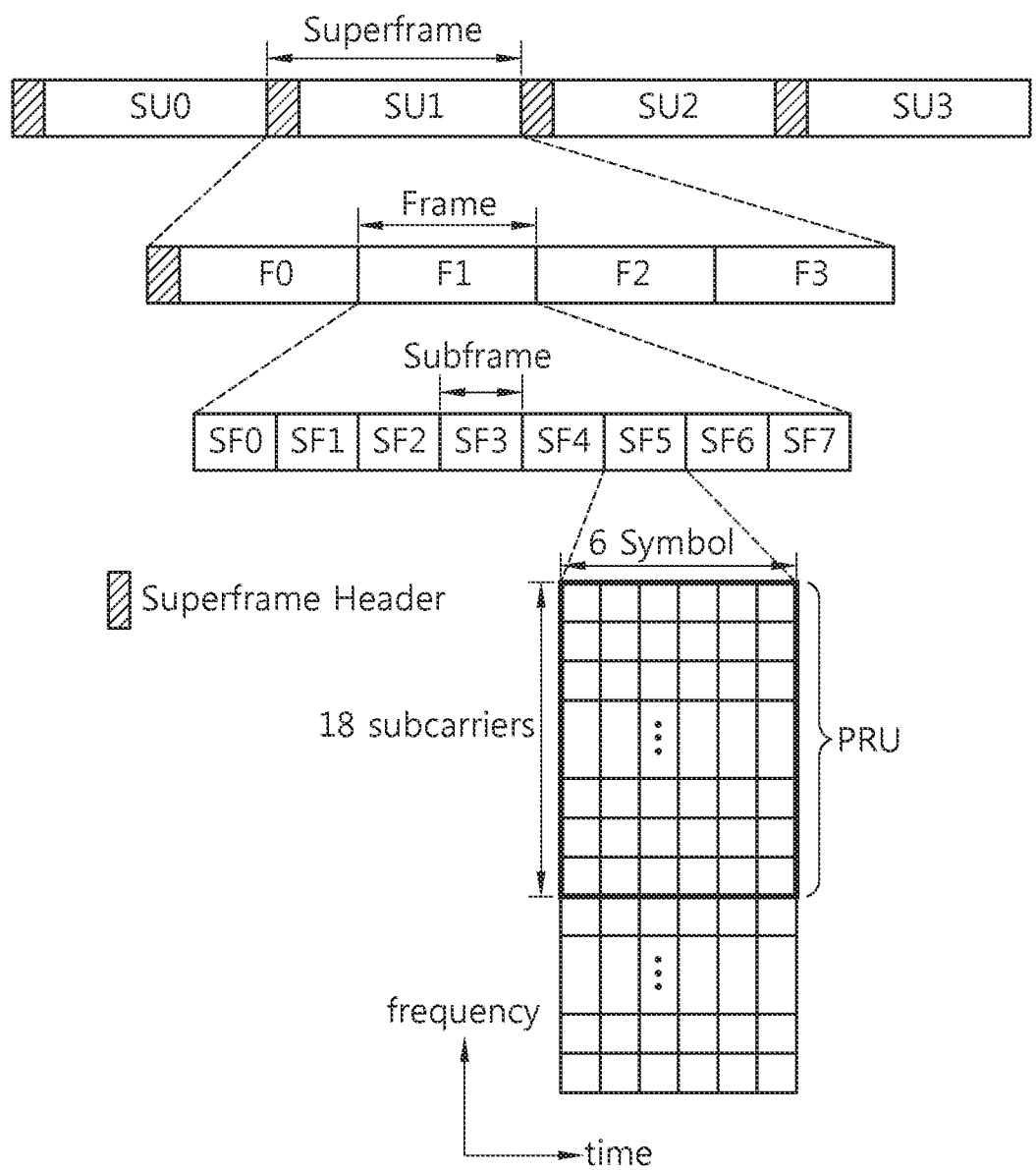
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

A time division duplex (TDD) scheme or a frequency division duplex (FDD) scheme may be applied to the frame. In the TDD scheme, each subframe is used in UL or DL transmission at the same frequency and at a different time. That is, subframes included in a frame based on the TDD scheme are divided into a UL subframe and a DL subframe in the time domain. A switching point is a point at which a transmission direction changes from a UL region to a DL region or from the DL region to the UL region. The number of switching points in each frame may be 2 in the TDD scheme. In the FDD scheme, each subframe is used in UL or DL transmission at the same time and at a different frequency. That is, subframes included in a frame based on the FDD scheme are segmented into UL subframes and DL subframes in the frequency domain. UL transmission and DL transmission occupy different frequency bands and can be simultaneously performed.

Figure 3:
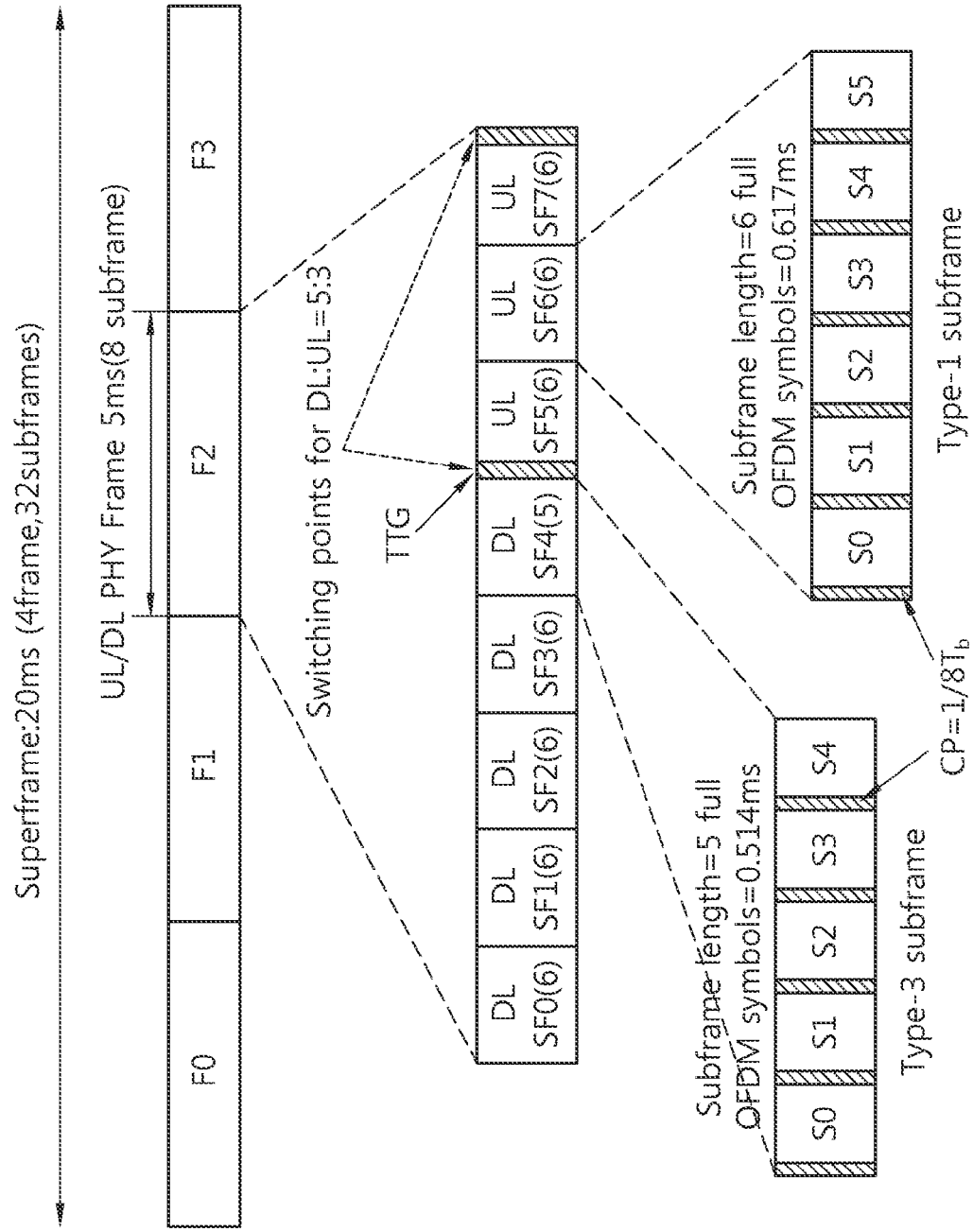
FIG. 3 shows an example of a time division duplex (TDD) frame structure.

FIG. 3 shows an example of a TDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and a ratio of a DL subframe to a UL subframe is 5:3. The TDD frame structure of FIG. 3 can be used when a bandwidth is 5 MHz, 10 MHz, or 20 MHz.

The last DL subframe SF4 includes 5 OFDM symbols, and the remaining subframes include 6 subframes. A transition gap between UL and DL subframes is indicated by TTG in FIG. 3.

Figure 4:
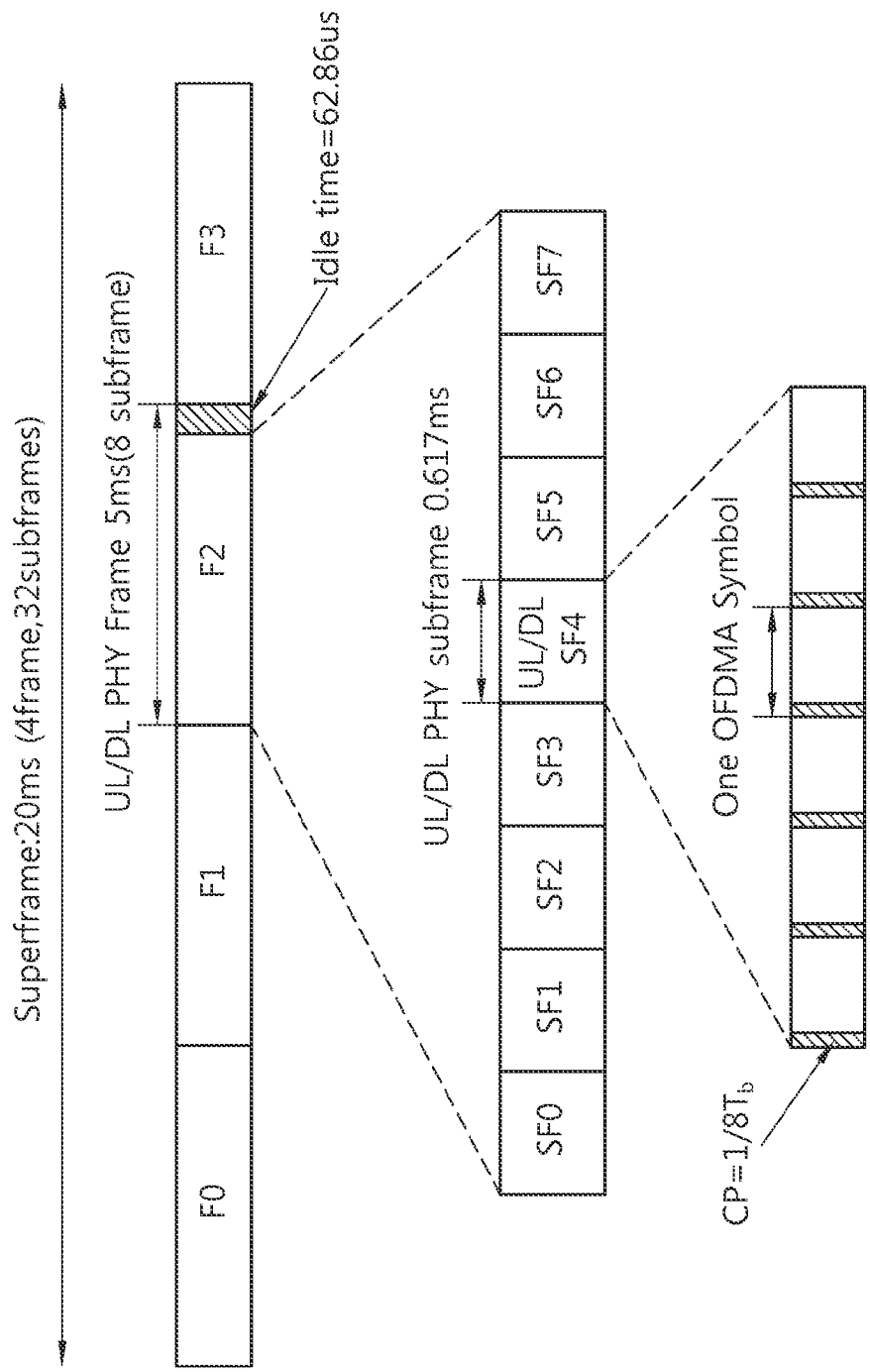
FIG. 4 shows an example of a frequency division duplex (FDD) frame structure.

FIG. 4 shows an example of an FDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and all subframes include a DL region and a UL region. The FDD frame structure of FIG. 4 can be used when a bandwidth is 5 MHz, 10 MHz, or 20 MHz.

In the present embodiment, circular buffer based rate matching is utilized to transmit a channel-coded bit. In the present embodiment, coding is performed with a mother code rate, and puncturing/repetition is performed thereon. Accordingly, data is included in a data block having a desired size.

Figure 5:
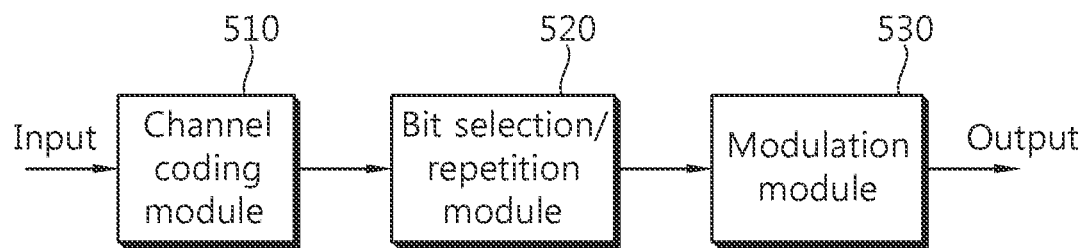
FIG. 5 shows an example of a data processing apparatus according to an embodiment of the present invention.

FIG. 5 shows an example of a data processing apparatus according to an embodiment of the present invention. A transmitter employed by an MS or a BS may be included in the example of FIG. 5. The apparatus of FIG. 5 may include a channel coding module 510, a bit selection/repetition module 520, and a modulation module 530. The channel coding module 510 performs channel coding in various manners. The bit selection/repetition module 520 selects and repeats a bit to perform rate matching on the channel-coded bit. The modulation module 530 performs constellation mapping according to a constellation rearrangement version (CRV) on bits output from the bit selection/repetition module 520. The constellation symbol generated by the modulation module 530 is inserted to a sub-packet and is then transmitted through at least one antenna.

An additional module can be included between the modules shown in FIG. 5. Each module can be integrated into another module. A receiver included in the MS or the BS can include the modules of FIG. 5 in a reverse order.

Figure 6:
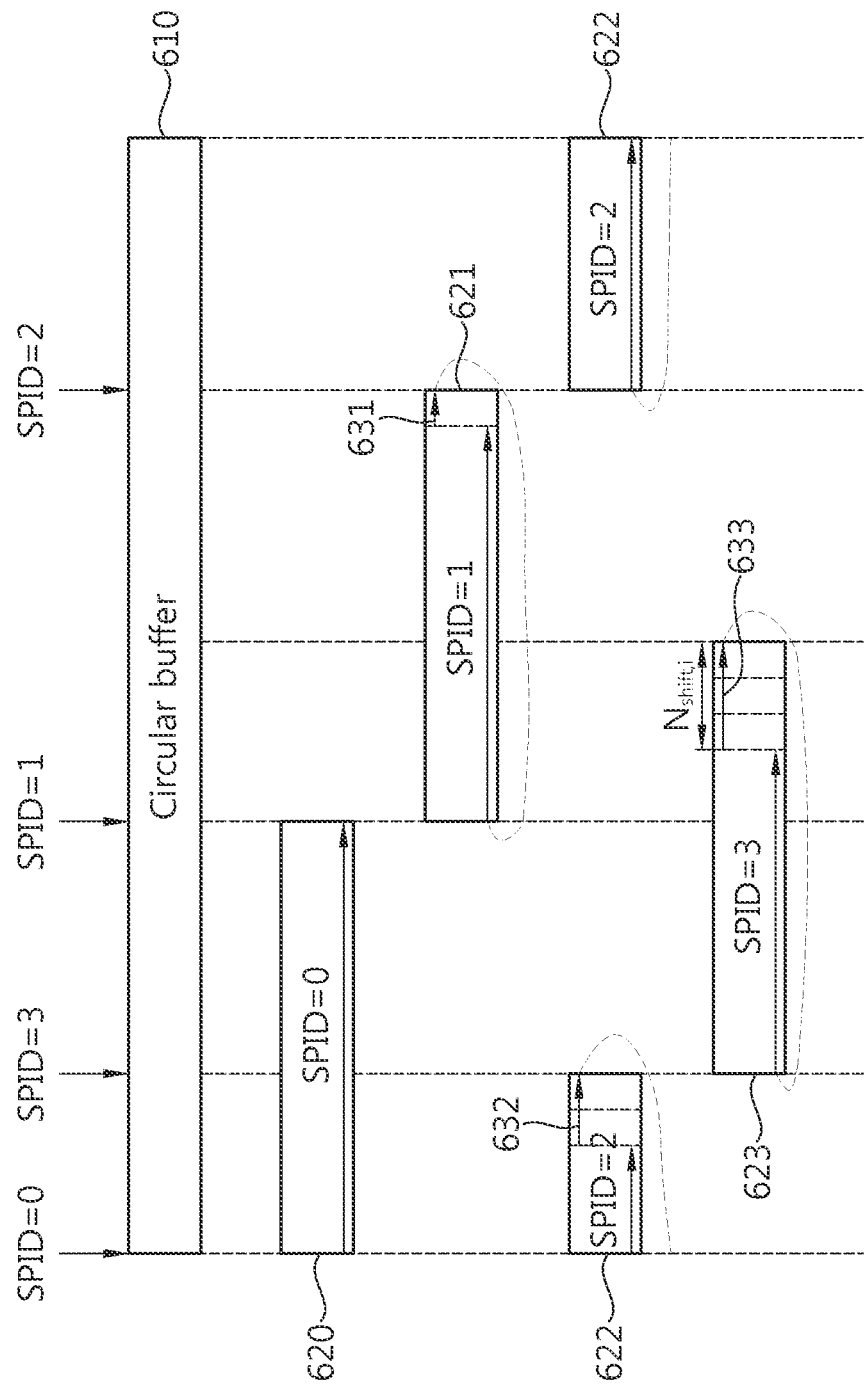
FIG. 6 shows an example of selecting bits input to a circular buffer.

FIG. 6 shows an example of selecting bits input to a circular buffer. The example of FIG. 6 may relate to a UL IR-HARQ scheme. A channel-coded bit can be input to a circular buffer 610. In this case, a bit included in a sub-packet can be selected according to various parameters such as a sub-packet ID (SPID). That is, UL bit selection can be performed according to the various parameters.

As shown in FIG. 6, the bit input to the circular buffer can correspond to a sub-packet #0 620 indicated by an SPID 0, a sub-packet #1 621 indicated by an SPID 1, a sub-packet #2 622 indicated by an SPID 2, and a sub-packet #3 623 indicated by an SPID 3.

In addition, as shown in FIG. 6, a bit corresponding to each sub-packet can be selected from a position spaced apart by $N_{shift,i}$ from a last bit of each sub-packet on the circular buffer 610. For example, the sub-packet #1 indicated by the SPID 1 can be selected from a position spaced apart by an $N_{shift,i}$ 631 from a position moved by a sub-packet length from a starting position on the circular buffer. In this case, the $N_{shift,i}$ 631 may be $N_{mod}$. In addition, the sub-packet #2 indicated by the SPID 2 can be selected from a position spaced apart by an $N_{shift,i}$ 632 from a position moved by a sub-packet length from a starting position on the circular buffer. In this case, the $N_{shift,i}$ 632 may be $2 \times N_{mod}$. In addition, the sub-packet #3 indicated by the SPID 3 can be selected from a position spaced apart by an $N_{shift,i}$ 633 from a position moved by a sub-packet length from a starting position on the circular buffer. In this case, the $N_{shift,i}$ 633 may be $3 \times N_{mod}$. In addition, bit selection can be achieved without space separation in the sub-packet #0 indicated by the SPID 0 since $N_{shift,i}$ is set to 0. $N_{mod}$ denotes a modulation order. The modulation order can be set to 6 when a QPSK symbol is generated, can be to 4 when a 16QAM symbol is generated, and can be to 6 when a 64 QAM symbol is generated.

A value $N_{shift,i}$ for determining a starting position $P_{i,k}$ at which bit selection begins in uplink can be determined by Equation 1 below.

$$N_{shift,i} = i \cdot N_{mod} \qquad [\text{Equation 1}]$$

In Equation 1, i denotes a sub-packet ID (also referred to as SPID). Hereinafter, i and SPID will be used for the same meaning. The starting position $P_{i,k}$ at which bit selection begins in uplink can be expressed by Equation 2 below.

$$P_{i,k} = (\text{SPID} \cdot N_{CTC,k}) \bmod N_{FB\_Buffer,k} \qquad [\text{Equation 2}]$$

In Equation 2, $N_{CTC,k}$ denotes the number of sub-packets generated in a $k^{th}$ FEC block. The FEC block may correspond to an output generated by the channel coding module 510 of FIG. 5. $N_{CTC,k}$ can be determined by Equation 3 below.

$$N_{CTC,k} = N_{RE,k} \cdot N_{SM} \cdot N_{mod} \qquad [\text{Equation 3}]$$

In Equation 3, $N_{RE,k}$ denotes the number of data tones for sub-packets segmented into $K_{FB}$ blocks in one FEC block. Specifically, $N_{RE,k}$ denotes the number of data tones for a $k^{th}$ FEC block. $N_{RE,k}$ can be determined by Equation 4 below. In addition, the number of data tones implies the number of transmissible constellation symbols (e.g., QAM symbols).

$$N_{RE,k} = K_{RS} \cdot \left\lfloor \frac{\frac{N_{RE}}{K_{RS}} + (K_{FB} - k - 1)}{K_{FB}} \right\rfloor, 0 \le k < K_{FB} \qquad [\text{Equation 4}]$$

In Equation 4, $\lfloor \bullet \rfloor$ denotes a floor function. In addition, $K_{RS}$ is set to 1 when the number of MIMO steams is 1, and is set to 2 when the number of MIMO streams exceeds 1. According to Equation 4, if the number of MIMO streams exceeds 1, $N_{RE,k}$ is set to an even number in each FEC block.

In Equation 3, $N_{SM}$ denotes a space-time coding (STC) rate (or the number of MIMO streams) allocated to a corresponding burst. Meanwhile, in Equation 2, $N_{FB\_Buffer,k}$ may indicate a buffer size for the $k^{th}$ FEC block. For reference, $N_{FB\_Buffer,k}$ is equal to the number of coded bits which are output from the channel coding module 510 with a mother coding rate.

Figure 7:
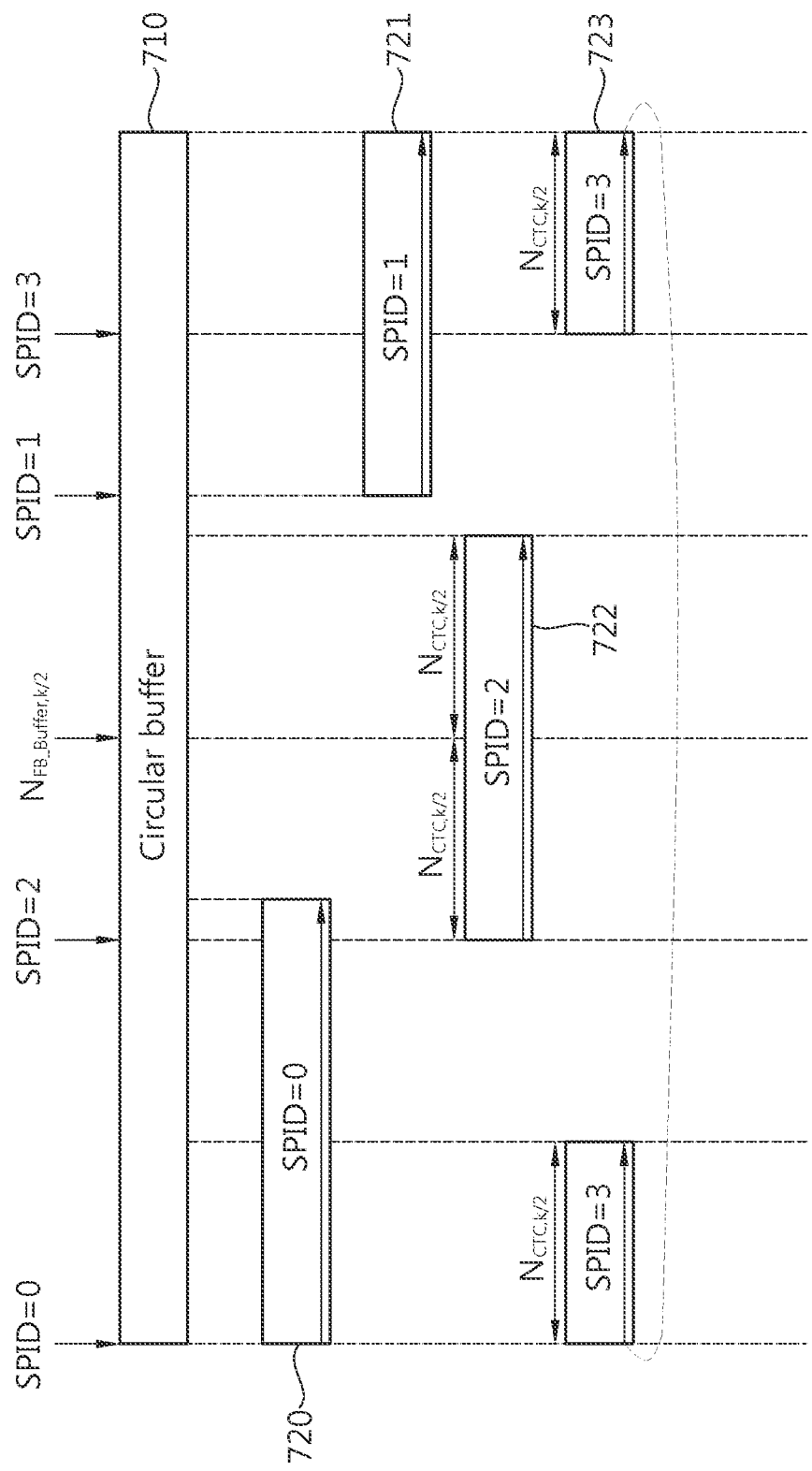
FIG. 7 shows another example of selecting bits input to a circular buffer.

FIG. 7 shows another example of selecting bits input to a circular buffer. The example of FIG. 7 can be used in a DL IR-HARQ scheme. The channel-coded bit can be input to a circular buffer 710. In this case, a bit that is input to the circular buffer can be selected according to various parameters (e.g., SPID, etc.). A starting position for DL bit selection can be determined by Table 1 below.

TABLE 1

| SPID | $P_{i,k}$ |
|---|---|
| 0 | 0 |
| 1 | $(-N_{CTC,k}) \bmod (N_{FB\_Buffer,k})$ |
| 2 | $(N_{FB\_Buffer,k}/2 - N_{CTC,k}/2) \bmod (N_{FB\_Buffer,k})$ |
| 3 | $(N_{FB\_Buffer,k} - N_{CTC,k}/2) \bmod (N_{FB\_Buffer,k})$ |

When the starting position is determined as shown in Table 1 above, four sub-packets 720, 721, 722, and 723 can be selected as shown in FIG. 7.

Hereinafter, a scheme of applying constellation mapping to selected bits will be described. For example, when applying an HARQ scheme, it is preferable to perform different constellation mapping according to a CRV. The CRV can apply only to a 16 QAM symbol and a 64 QAM symbol.

TABLE 2

| constellation symbol | $N_{mod}$ | CRV | mapping rule | | | | | |
|---|---|---|---|---|---|---|---|---|
| 16 QAM | 4 | 0 | b0 | b1 | b2 | b3 | — | — |
| 16 QAM | 4 | 1 | b3 | b2 | b1 | b0 | — | — |
| 64 QAM | 6 | 0 | b0 | b1 | b2 | b3 | b4 | b5 |
| 64 QAM | 6 | 1 | b5 | b4 | b3 | b2 | b1 | b0 |

Table 2 shows a rule of performing constellation mapping when the number of MIMO streams is set to 1. As shown in Table 2, an order of bits constituting one constellation symbol is changed along with a change in the CRV. If the CRV is properly changed when performing the HARQ, an additional gain can be obtained based on constellation rearrangement.

TABLE 3

| constellation symbol | $N_{mod}$ | CRV | mapping rule | | | | | | | | | | | |
|---|---|---|---|---|---|---|---|---|---|---|---|---|---|---|
| | | | even symbol | | | | | | odd symbol | | | | | |
| 16 QAM | 4 | 0 | b0 | b1 | b2 | b3 | — | — | — | b4 | b5 | b6 | b7 | — | — |
| 16 QAM | 4 | 1 | b1 | b4 | b3 | b6 | — | — | — | b5 | b0 | b7 | b2 | — | — |
| 64 QAM | 6 | 0 | b0 | b1 | b2 | b3 | b4 | | b5 | b6 | b7 | b8 | b9 | b10 | b11 |
| 64 QAM | 6 | 1 | b2 | b7 | b0 | b5 | b10 | | b3 | b8 | b1 | b6 | b11 | b4 | b9 |

Table 3 explains a rule of performing constellation mapping when the number of MIMO streams exceeds 1. As shown in Table 3, if the number of MIMO streams exceeds 1, the constellation symbol can be segmented into an even symbol and an odd symbol. That is, two different domains can be present in the constellation symbol.

In an IEEE 802.16m system, the CRV can be changed whenever a wraparound occurs at an end of a circular buffer. That is, if the CRV is 0 at the end of the circular buffer, the CRV can be set to 1 after the wraparound occurs. If the CRV is changed whenever the wraparound occurs, an additional gain based on constellation rearrangement can be obtained in retransmission. In addition, when the IEEE 802.16m system determines the CRV, it can be assumed that $N_{shift,i}$ is "0" in FIG. 6 with respect to all sub-packets.

When applying the mapping rule of Table 3, the even symbol and the odd symbol can constitute one symbol pair. It is preferable in this case that an identical CRV is applied to two constellation symbols included in one symbol pair. However, if the CRV is changed whenever the wraparound occurs at the end of the circular buffer, CRVs of constellation symbols that make a pair can be determined differently.

Hereinafter, a case where a CRV of an even symbol and a CRV of an odd symbol are determined differently when the even and odd symbols make a pair will be described.

TABLE 4

|  | Type1 | Type2 | Type3 |
|---|---|---|---|
| #Subcarriers per RU | 108 | 90 | 126 |

Table 4 shows the number of subcarriers (i.e., the number of tones) included in a resource unit (RU) according to a type in the IEEE 802.16m system.

TABLE 5

| #MIMO stream | #Pilot subcarriers per RU | | | #QAM symbol per RU | | | #QAM symbol/2 mod 2 | | |
|---|---|---|---|---|---|---|---|---|---|
|  | Type1 | Type2 | Type3 | Type1 | Type2 | Type3 | Type1 | Type2 | Type3 |
| 2 Stream | 12 | 10 | 14 | 192 | 160 | 224 | 0 | 0 | 0 |
| 3 Stream | 12 | 12 | 12 | 288 | 234 | 342 | 0 | 1 | 1 |
| 4 Stream | 16 | 16 | 16 | 368 | 296 | 440 | 0 | 0 | 0 |

Table 5 shows the number of QAM symbols included in an RU per subframe type according to each type and the number of MIMO streams. As indicated, if the number of MIMO streams is 3 and a subframe type is "2" or "3", a value obtained by dividing the number of QAM symbols by 2 is set to an odd number. If the value obtained by dividing the number of QAM symbols by 2 is set to the odd number, there may be a problem in that CRVs of even and odd symbols constellation symbols that make a pair can be determined differently.

Hereinafter, the aforementioned problem will be described in greater detail.

Figure 8:
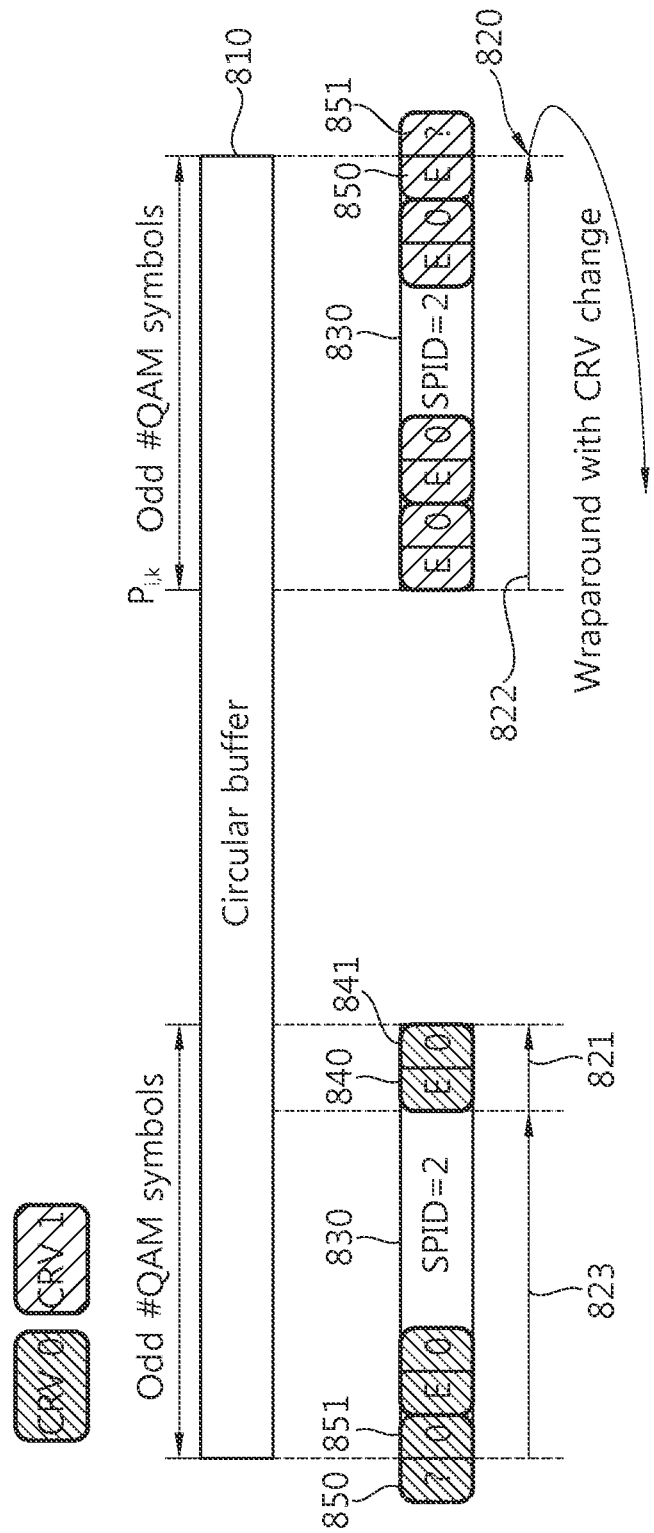
FIG. 8 shows an example of differently determining constellation rearrangement versions (CRVs) of even and odd symbols that make a pair.

FIG. 8 shows an example of differently determining CRVs of even and odd symbols that make a pair. The example of FIG. 8 relates to uplink transmission and also relates to a case where the number of MIMO streams exceeds 1 and a constellation symbol is segmented into an even symbol (indicated by "E" in FIG. 8) and an odd symbol (indicated by "O" in FIG. 8). In addition, the example of FIG. 8 relates to a case where an odd number of constellation symbols (e.g., QAM symbols) are included before or after a position 820 at which a wraparound occurs, when SPID mod 2=0 is satisfied.

As shown in FIG. 8, a sub-packet 830 having an SPID 2 can be generated from a circular buffer 810. In this case, for convenience of explanation, the sub-packet 830 can be segmented into three parts 821, 822, and 823. The first part 821 of the sub-packet 830 is a part which is shifted by $N_{shift,i}$ bits after moving in the circular buffer 810 by $N_{CTC,k}$ from a starting position $P_{i,k}$. That is, the first part 821 consists of two constellation symbols 840 and 841 corresponding to $N_{shift,i}$ bits. When a starting value of a CRV is set to "1", a CRV of the second part 822 can be set to "1". Since the CRV is preferably changed whenever a wraparound occurs at the end of the circular buffer to obtain a gain on the basis of constellation rearrangement as described above, the CRV is changed before/after the end 820 of the circular buffer. That is, a CRV of the second part 822 is set to "1", and a CRV of the third part 823 is set to "0". In this case, a CRV of a constellation symbol 850 before the wraparound occurs is determined to be the same as the CRV (i.e., "1") of the second part 822, and a CRV of a constellation symbol 851 after the wraparound occurs is determined to be the same as the CRV (i.e., "0") of the first part 821 and the third part 823. That is, there is a problem in that CRVs of the even symbol 850 and the odd symbol 851 that make a pair are determined differently.

Figure 9:
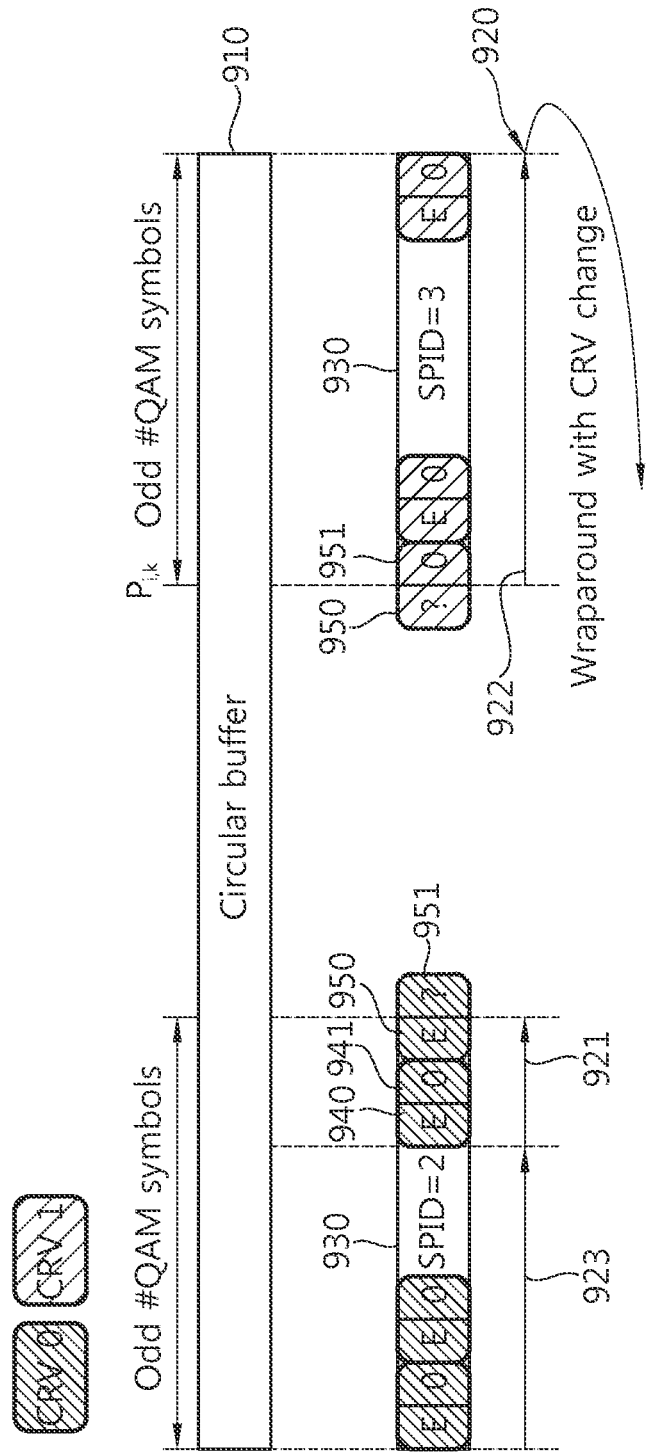
FIG. 9 shows another example of differently determining CRVs of even and odd symbols that make a pair

FIG. 9 shows another example of differently determining CRVs of even and odd symbols that make a pair. The example of FIG. 9 relates to a case where an odd number of constellation symbols are included before or after a position 920 at which a wraparound occurs (i.e., a case where the number of MIMO streams is 3), when SPID mod 2=1 is satisfied.

As shown in FIG. 9, a sub-packet 930 having an SPID 3 can be generated from a circular buffer 910. As described above, the sub-packet 930 can be segmented into a first part 921, a second part 922, and a third part 923. When a starting value of a CRV is set to "1", a CRV of the second part 922 can beset to "1". In this case, since the CRV is changed at the end 920 of a circular buffer in which a wraparound occurs, CRVs of the first part 921 and the third part 923 are set to "0". In the example of FIG. 9, three constellation symbols 940, 941, and 950 are included in the first part 921. In this case, there is a problem in that two symbols 950 and 951 that make a pair are included in the first part 921 and the second part 922. That is, the two symbols 950 and 951 that make a pair are determined differently.

Figure 10:
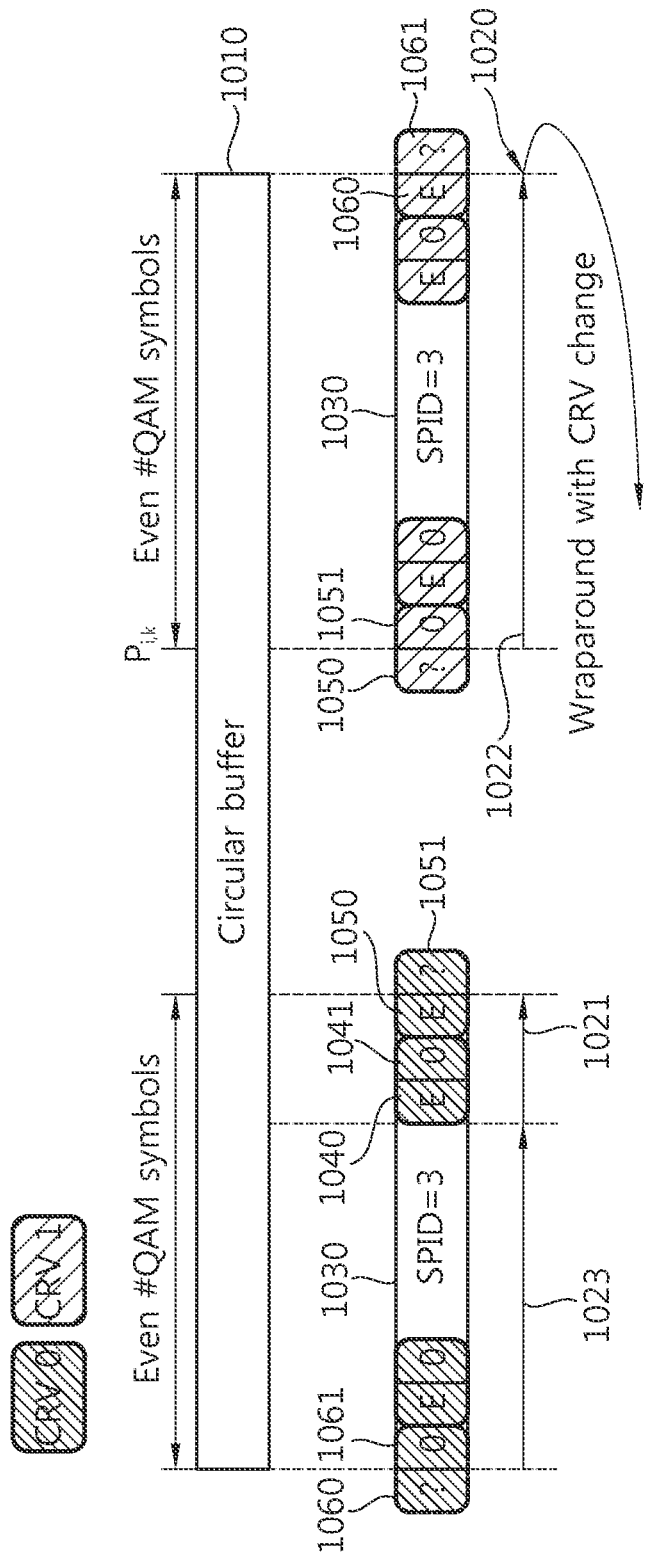
FIG. 10 shows another example of differently determining CRVs of even and odd symbols that make a pair.

FIG. 10 shows another example of differently determining CRVs of even and odd symbols that make a pair. The example of FIG. 10 relates to a case where an even number of constellation symbols are included before or after a position 1020 at which a wraparound occurs, when SPID mod 2=1 is satisfied.

As shown in FIG. 10, a sub-packet 1030 having an SPID 3 can be generated from a circular buffer 1010. As described above, the sub-packet 1030 can be segmented into a first part 1021, a second part 1022, and a third part 1023. When a starting value of a CRV is set to "1", a CRV of the second part 1022 can be set to "1". In this case, since the CRV is changed at the end 1020 of a circular buffer in which a wraparound occurs, CRVs of the first part 1021 and the third part 1023 are set to "0". In the example of FIG. 10, three constellation symbols 1040, 1041, and 1050 are included in the first part 1021. In this case, there is a problem in that two symbols 1050 and 1051 that make a pair are included in the first part 1021 and the second part 1022. In addition, in the example of FIG. 10, a pair of symbols 1060 and 1061 is included in the end 1020 of the circular buffer in which the wraparound occurs. In this case, there is a problem in that two symbols 1060 and 1061 that make a pair are included in the second part 1022 and the third part 1023.

The aforementioned problem can be improved by an exemplary embodiment described below. Specifically, when a signal is transmitted using multiple MIMO streams, there is provided a rule in which a CRV of an even symbol and a CRV of an odd symbol subsequent to the even symbol are always equally determined. That is, although the CRV is changed whenever a wraparound occurs at an end of a circular buffer in order to obtain a gain on the basis of constellation rearrangement, if an even symbol included in a pair of symbols is located at the end of the circular buffer and odd symbol is located at a start of the circular buffer, CRVs of the even symbol and the odd symbol are determined equally. One aspect of the aforementioned rule can be implemented according to Equation 5.

$$CRV_{j,k} = \left( CRV_{starting,k} + \left\lfloor \frac{\left\lfloor \frac{P_{i,k}/N_{mod}}{2} \right\rfloor \cdot 2 + n}{N_{FB\_Buffer,k}/N_{mod}} \right\rfloor \right) \mod 2 \quad \text{[Equation 5]}$$

where $$n = \left( N_{QAM,k} - \left\lfloor \frac{SPID}{2} \right\rfloor \cdot 2 + j \right) \mod N_{QAM,k}$$

and $$j = 0, 1, 2, \ldots, N_{QAM,k} - 1.$$

In Equation 5, $CRV_{j,k}$ denotes a CRV of a $j^{th}$ constellation symbol included in a $k^{th}$ FEC block including a sub-packet. $\lfloor \cdot \rfloor$ denotes a floor function. $\lfloor \cdot \rfloor$ denotes a modulo operation. $CRV_{starting,k}$ denotes a starting value for the constellation rearrangement version. $P_{i,k}$ denotes a starting point of the sub-packet. $N_{mod}$ denotes a modulation order. $N_{FB\_Buffer,k}$ denotes a buffer size for the $k^{th}$ FEC block. $N_{QAM,k}$ denotes the number of constellation symbols included in the $k^{th}$ FEC block. i and SPID denote an identifier (ID) for the sub-packet.

When the CRV is applied as shown in Equation 5, an identical CRV is given to a pair of even and odd symbols in a system in which the number of MIMO streams exceeds 1.

Figure 11:
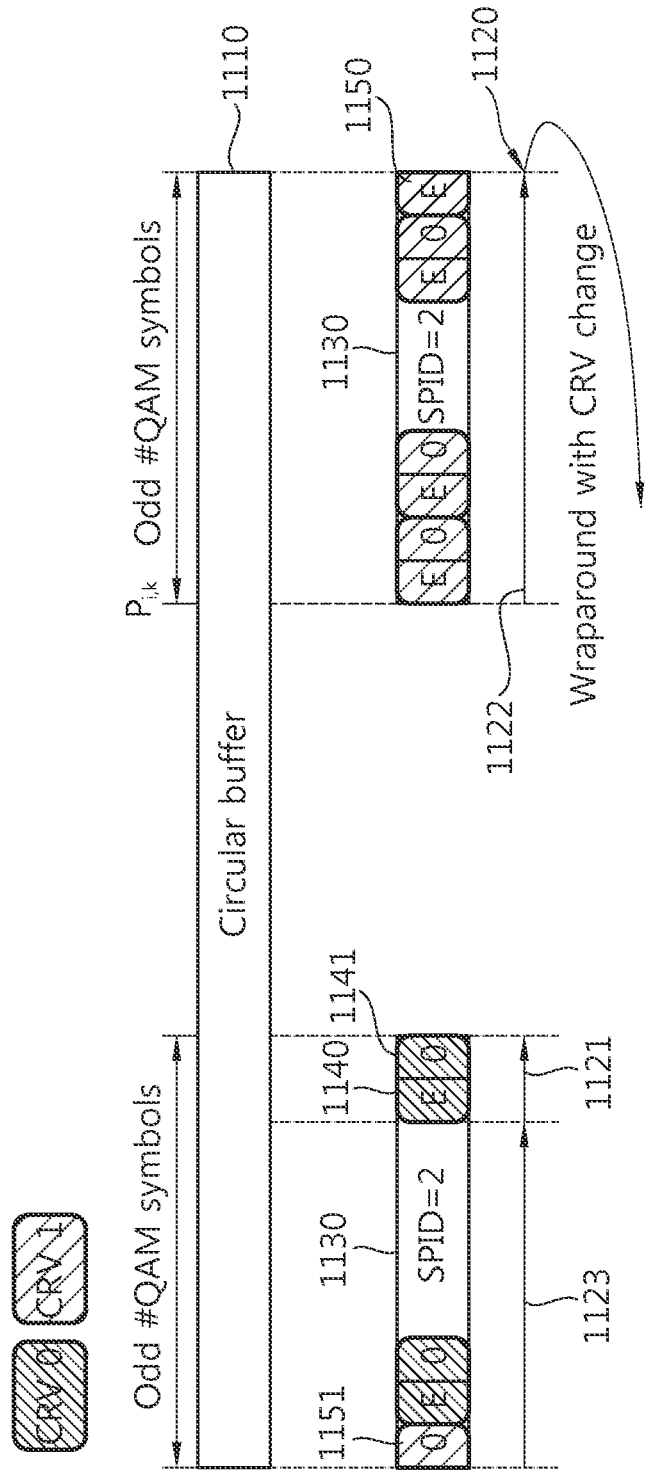
FIG. 11 shows an example of an operation based on Equation 5.

FIG. 11 shows an example of an operation based on Equation 5. The example of FIG. 11 relates to a case where an odd number of constellation symbols are included before or after a position 1120 at which a wraparound occurs, when SPID mod 2=0 is satisfied.

As shown in FIG. 11, a sub-packet 1130 having an SPID 2 can be generated from a circular buffer 1110. As described above, the sub-packet 1130 can be segmented into a first part 1121, a second part 1122, and a third part 1123. When a starting value of a CRV is set to "1", a CRV of the second part 1122 can be set to "1". In this case, since the CRV is changed at the end 1120 of a circular buffer in which a wraparound occurs, CRVs of the first part 1121 and the third part 1123 are set to "0". When the CRV is determined according to Equation 5, the CRV is determined equally for a pair of symbols 1150 and 1151 included in the end 1120 of the circular buffer in which the wraparound occurs. That is, the odd symbol 1151 included in a pair of symbols is determined such that a wraparound CRV is not changed even though the wraparound occurs.

Figure 12:
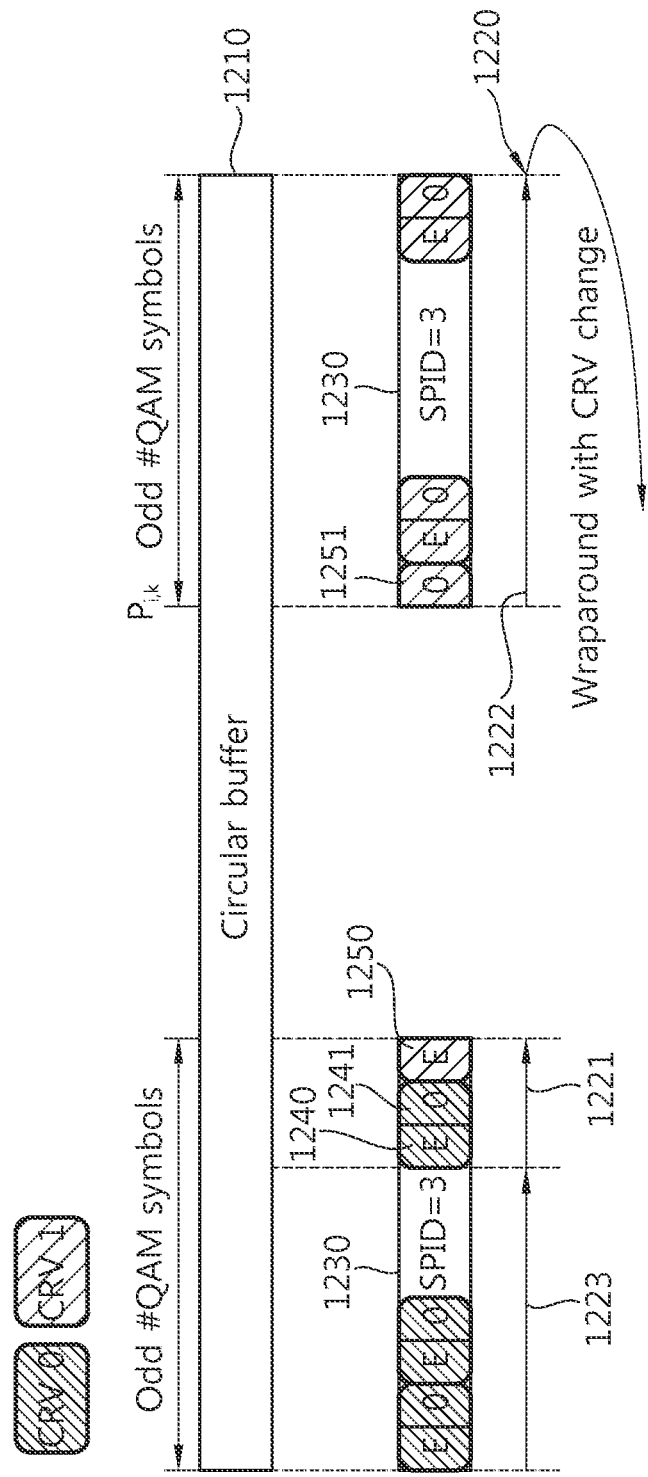
FIG. 12 shows another example of an operation based on Equation 5.

FIG. 12 shows another example of an operation based on Equation 5. The example of FIG. 12 relates to a case where an odd number of constellation symbols are included before or after a position 1220 at which a wraparound occurs, when SPID mod 2=1 is satisfied.

As shown in FIG. 12, a sub-packet 1230 having an SPID 3 can be generated from a circular buffer 1210. As described above, the sub-packet 1230 can be segmented into a first part 1221, a second part 1222, and a third part 1223. When a starting value of a CRV is set to "1", a CRV of the second part 1222 can be set to "1". In this case, since the CRV is changed at the end 1220 of a circular buffer in which a wraparound occurs, CRVs of the first part 1221 and the third part 1223 are set to "0". When the CRV is determined according to Equation 5, three symbols 1240, 1241, and 1250 can be included in the first part 1221. In this case, a CRV of a pair of the even symbol 1240 and the odd symbol 1241 is set to "0". In addition, since the even symbol 1250 included in the first part and the odd symbol 1251 included in the second part make a pair, an identical CRV is set thereto. That is, even though the even symbol 1250 is included in the first part 1221, a CRV of the even symbol 1250 included in the first part is determined equally to that of the second part 1222.

Figure 13:
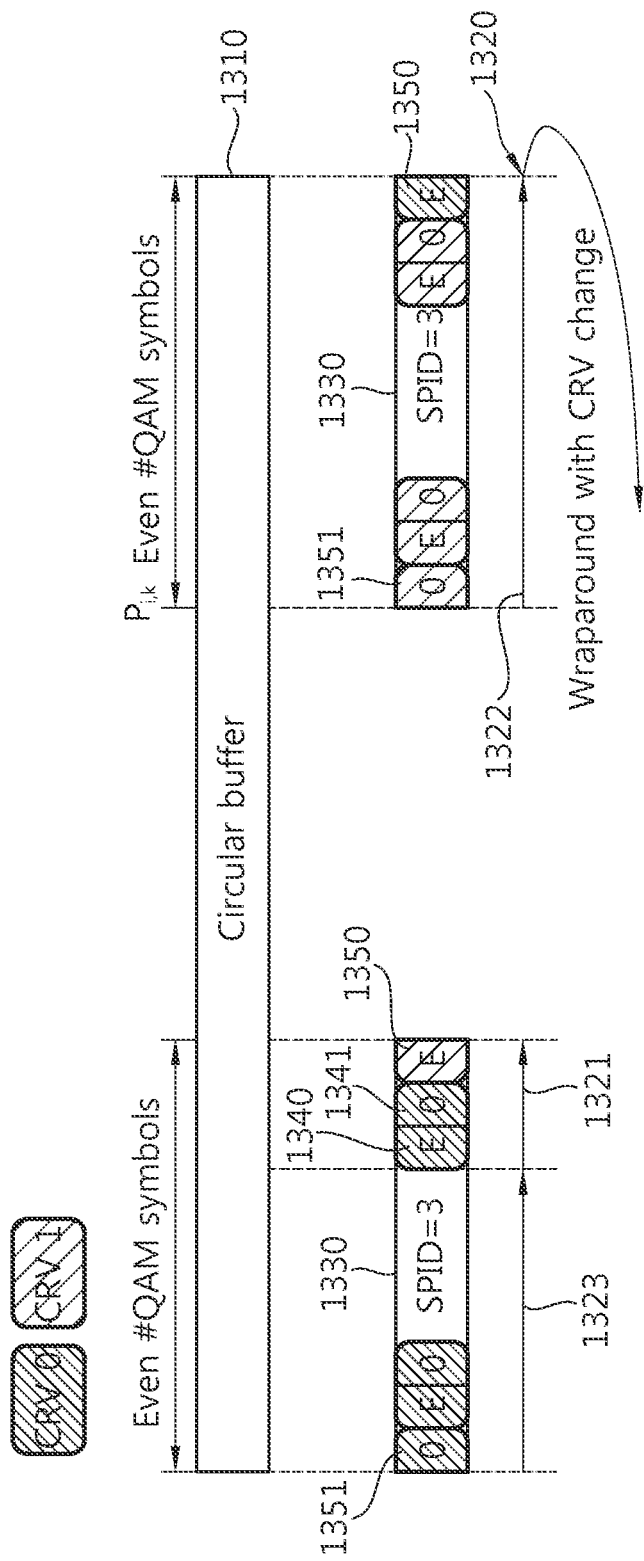
FIG. 13 shows another example of an operation based on Equation 5.

FIG. 13 shows another example of an operation based on Equation 5. The example of FIG. 13 relates to a case where an even number of constellation symbols are included before or after a position 1320 at which a wraparound occurs, when SPID mod 2=1 is satisfied.

As shown in FIG. 13, a sub-packet 1330 having an SPID 3 can be generated from a circular buffer 1310. As described above, the sub-packet 1330 can be segmented into a first part 1321, a second part 1322, and a third part 1323. When a starting value of a CRV is set to "1", a CRV of the second part 1322 can be set to "1". In this case, since the CRV is changed at the end 1320 of a circular buffer in which a wraparound occurs, CRVs of the first part 1321 and the third part 1323 are set to "0". When the CRV is determined according to Equation 5, three symbols 1340, 1341, and 1350 can be included in the first part 1321. In this case, a CRV of a pair of the even symbol 1340 and the odd symbol 1341 is set to "0". Further, since the even symbol 1350 included in the first part and the odd symbol 1351 included in the second part make a pair, an identical CRV is set thereto. Furthermore, an identical CRV is set to a pair of symbols 1360 and 1361 included in the end 1320 of the circular buffer in which the wraparound occurs.

Equation 5 can be expressed in various manners. For example, it can be expressed by Equation 6. Since the content of Equation 6 is identical to the content of Equation 5, it is apparent that the example related to Equation 5 also applies to Equation 6.

$$CRV_{j,k} = \left( CRV_{starting,k} + \left\lfloor \frac{\left\lfloor \frac{P_{i,k}/N_{mod}}{m} \right\rfloor \cdot m + n}{N_{FB\_Buffer,k}/N_{mod}} \right\rfloor \right) \mod 2 \quad \text{[Equation 6]}$$

where $$m = \begin{cases} 1 & \text{if } \# \text{ MIMO stream} = 1 \\ 2 & \text{otherwise,} \end{cases}$$

$$n = \left( N_{QAM,k} - \left\lfloor \frac{SPID}{m} \right\rfloor \cdot m + j \right) \mod N_{QAM,k}$$

$$j = 0, 1, 2, \ldots, N_{QAM,k} - 1.$$

Names of parameters used in Equation 5 and Equation 6 can change. Therefore, it is apparent that the present invention is not limited to specific parameter names. For example, a variable m used in Equation 6 can be replaced with another name.

Instead of Equation 5 above, the CRV can be determined based on Equation 7 below.

$$CRV_{j,k} = \left( CRV_{starting,k} + \left\lfloor \frac{\left[ \frac{P_{i,k}/N_{mod}}{2} \right] \cdot 2 + n}{N_{FB\_Buffer,k}/N_{mod}} \right\rfloor \right) \mod 2 \quad \text{[Equation 7]}$$

-continued where $$n = \left(N_{QAM,k} - \left\lceil \frac{SPID}{2} \right\rceil \cdot 2 + j\right) \bmod N_{QAM,k}$$
$$j = 0, 1, 2, \ldots, N_{QAM,k} - 1.$$

In Equation 7, $\lceil \bullet \rceil$ denotes a ceiling function. Meanwhile, Equation 7 can also be expressed by Equation 8 below.

$$CRV_{j,k} = \left(CRV_{starting,k} + \left\lfloor \frac{\left\lceil \frac{P_{i,k}/N_{mod}}{m} \right\rceil \cdot m + n}{N_{FB\_Buffer,k}/N_{mod}} \right\rfloor\right) \bmod 2 \quad \text{[Equation 8]}$$

where $$m = \begin{cases} 1 & \text{if } \# \text{ MIMO stream} = 1 \\ 2 & \text{otherwise} \end{cases}$$

$$n = \left(N_{QAM,k} - \left\lceil \frac{SPID}{m} \right\rceil \cdot m + j\right) \bmod N_{QAM,k}$$
$$j = 0, 1, 2, \ldots, N_{QAM,k} - 1.$$

Figure 14:
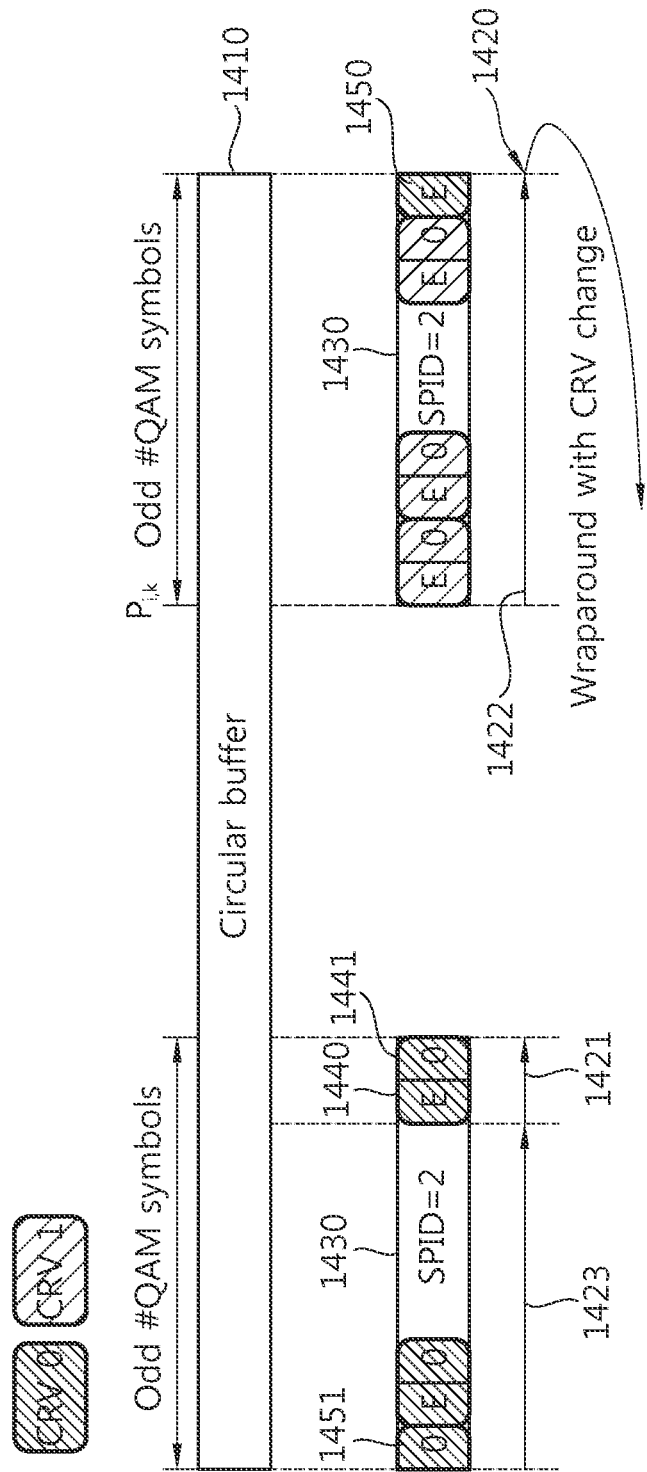
FIG. 14 shows another example of an operation based on Equation 7.

FIG. 14 shows another example of an operation based on Equation 7. The example of FIG. 14 relates to a case where an odd number of constellation symbols are included before or after a position 1420 at which a wraparound occurs, when SPID mod 2=0 is satisfied.

As shown in FIG. 14, a sub-packet 1430 having an SPID 2 can be generated from a circular buffer 1410. As described above, the sub-packet 1430 can be segmented into a first part 1421, a second part 1422, and a third part 1423. When a starting value of a CRV is set to "1", a CRV of the second part 1422 can be set to "1". In this case, since the CRV is changed at the end 1420 of a circular buffer in which a wraparound occurs, CRVs of the first part 1421 and the third part 1423 are set to "0". When the CRV is determined according to Equation 7, an identical CRV is set to a pair of symbols 1450 and 1451 included in the end 1420 of the circular buffer in which the wraparound occurs. Specifically, even though the even symbol 1450 included in a pair of symbols is included in the second part 1422, the same CRV value as the first and third parts is set thereto.

Figure 15:
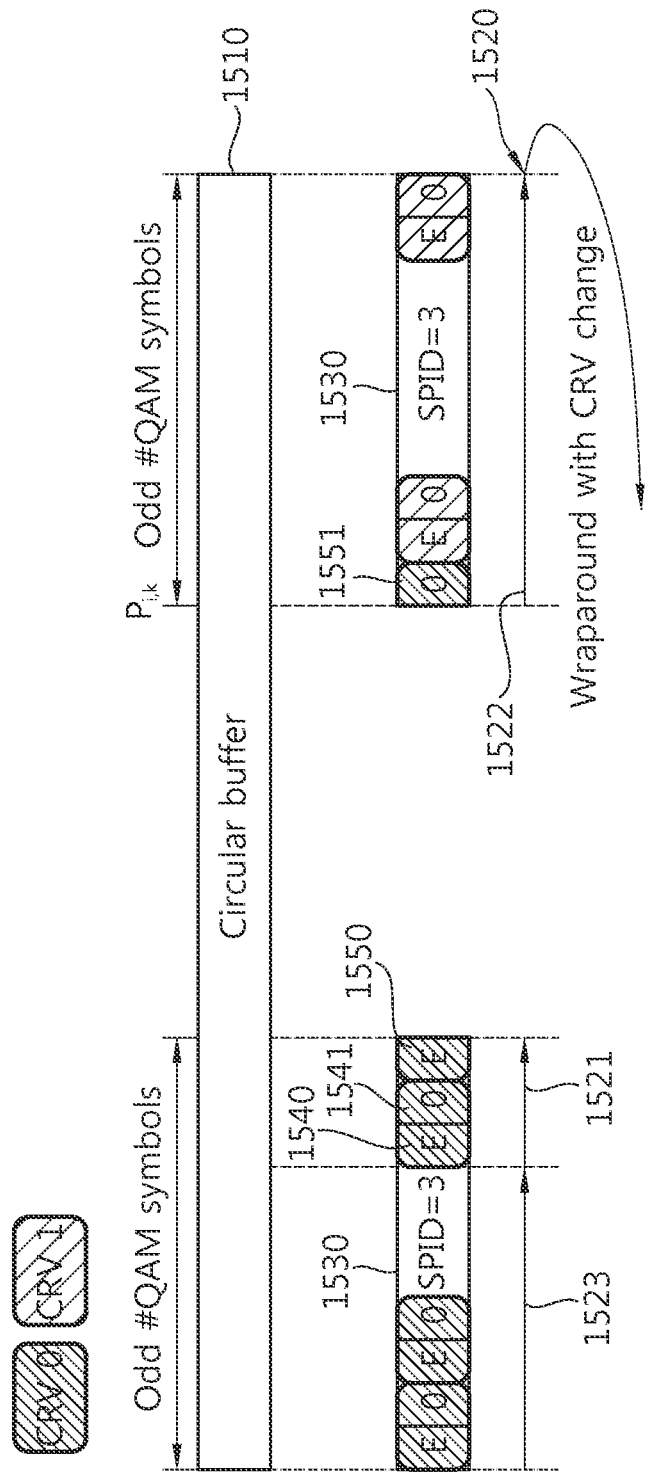
FIG. 15 shows another example of an operation based on Equation 7.

FIG. 15 shows another example of an operation based on Equation 7. The example of FIG. 15 relates to a case where an odd number of constellation symbols are included before or after a position 1520 at which a wraparound occurs, when SPID mod 2=1 is satisfied.

As shown in FIG. 15, a sub-packet 1530 having an SPID 3 can be generated from a circular buffer 1510. As described above, the sub-packet 1530 can be segmented into a first part 1521, a second part 1522, and a third part 1523. When a starting value of a CRV is set to "1", a CRV of the second part 1522 can be set to "1". In this case, since the CRV is changed at the end 1520 of a circular buffer in which a wraparound occurs, CRVs of the first part 1521 and the third part 1523 are set to "0". When the CRV is determined according to Equation 7, a CRV of a pair of an even symbol 1540 and an odd symbol 1541 is set to "0". In addition, since an even symbol 1550 included in the first part 1521 and an odd symbol 1551 included in the second part 1522 make a pair, an identical CRV is set thereto. That is, the CRV of the odd symbol 1551 included in the second part 1522 is set to "0" even though the odd symbol 1551 is included in the second part 1522.

Figure 16:
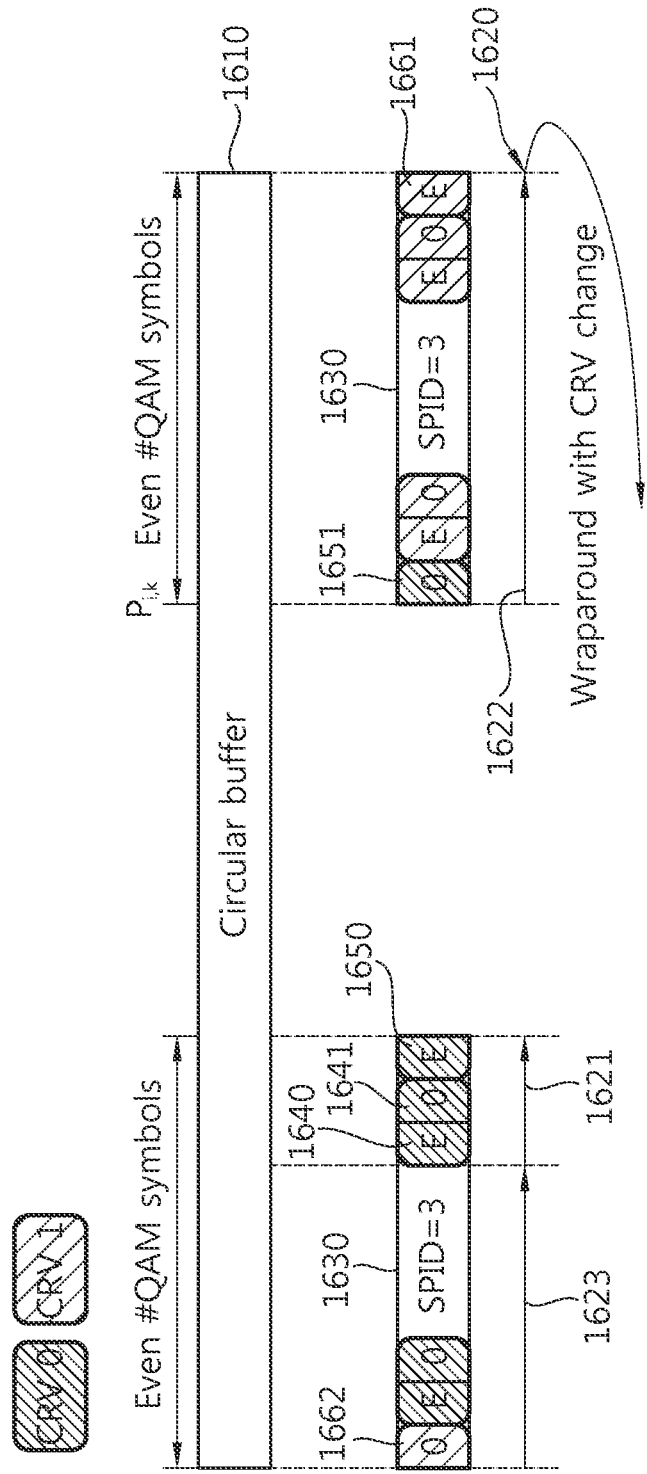
FIG. 16 shows another example of an operation based on Equation 7.

FIG. 16 shows another example of an operation based on Equation 7. The example of FIG. 16 relates to a case where an even number of constellation symbols are included before or after a position 1620 at which a wraparound occurs, when SPID mod 2=1 is satisfied.

As shown in FIG. 16, a sub-packet 1630 having an SPID 3 can be generated from a circular buffer 1610. As described above, the sub-packet 1630 can be segmented into a first part 1621, a second part 1622, and a third part 1623. When a starting value of a CRV is set to "1", a CRV of the second part 1622 can be set to "1". In this case, since the CRV is changed at the end 1620 of a circular buffer in which a wraparound occurs, CRVs of the first part 1621 and the third part 1623 are set to "0". When the CRV is determined according to Equation 7, the first part 1621 includes three symbols 1640, 1641, and 1650. A CRV of a pair of the even symbol 1640 and the odd symbol 1641 is set to "0". Meanwhile, since the even symbol 1650 included in the first part 1621 and an odd symbol 1651 included in the second part 1622 make a pair, an identical CRV is set thereto. That is, the CRV of the odd symbol 1651 included in the second part 1622 is set to "0" even though it is included in the second part 1622. In addition, an identical CRV is set to a pair of symbols 1660 and 1661 included in the end 1620 of the circular buffer in which the wraparound occurs. Specifically, even though the odd symbol 1661 included in a pair of symbols is included in the third part 1623, the same CRV value as the second part 1622 is set thereto.

The CRV value can be determined by using another rule other than the aforementioned equations. For example, the CRV can be set to 1 unconditionally when even and odd symbols (i.e., an even QAM symbol and an odd QAM symbol) that make a pair are no longer in pair. An example thereof is shown in FIG. 17.

Figure 17:
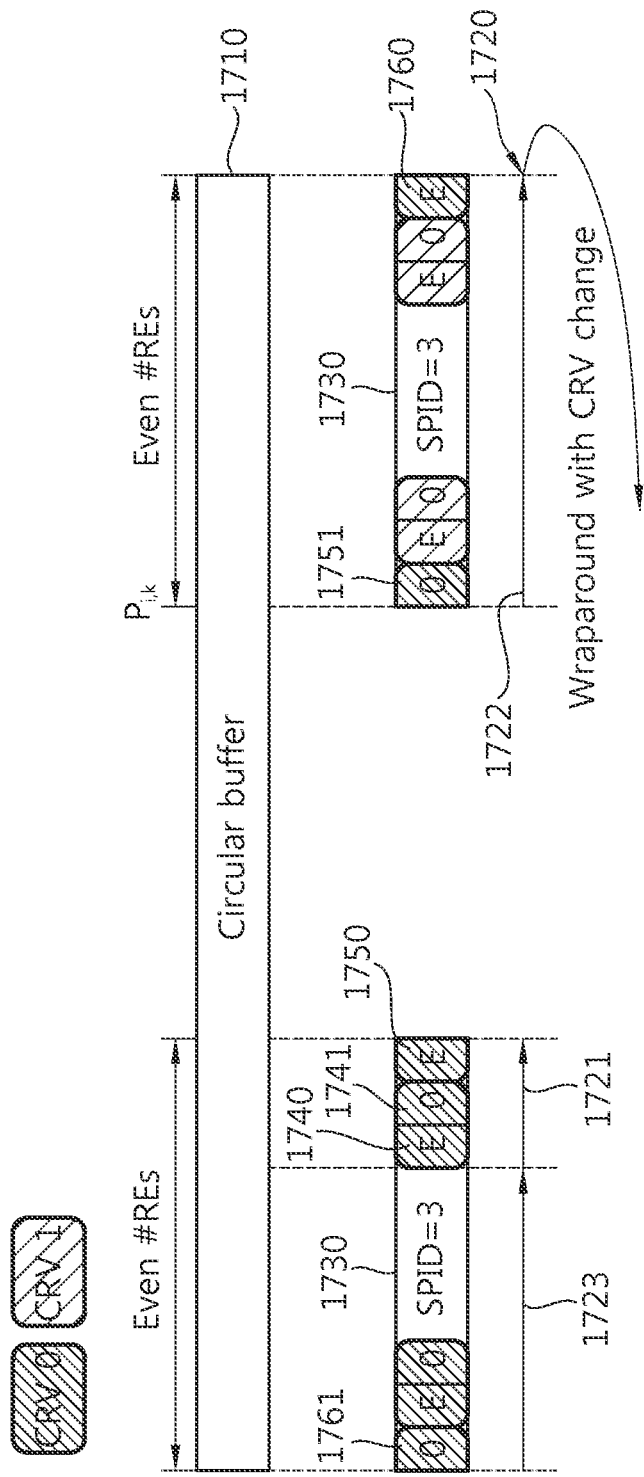
FIG. 17 shows an example of an operation based on the aforementioned rule.

FIG. 17 shows an example of an operation based on the aforementioned rule. As shown in FIG. 17, a sub-packet 1730 having an SPID 3 can be generated from a circular buffer 1710. As described above, the sub-packet 1730 can be segmented into a first part 1721, a second part 1722, and a third part 1723. The example of FIG. 17 relates to a case where the second part 1722 includes an even number of resource elements and the first and third parts 1721 and 1723 also include an even number of resource elements.

When a starting value of a CRV is set to "1", a CRV of the second part 1722 can be set to "1". In this case, since the CRV is changed at an end 1720 of a circular buffer in which a wraparound occurs, CRVs of the first part 1721 and the third part 1723 are set to "0". When the CRV is determined according to the aforementioned rule, the first part 1721 includes three symbols 1740, 1741, and 1750. A CRV of a pair of the even symbol 1740 and the odd symbol 1741 is set to "0". Meanwhile, since the even symbol 1750 included in the first part 1721 and an odd symbol 1751 included in the second part 1722 make a pair, an identical CRV is set thereto. That is, the CRV of the odd symbol 1751 included in the second part 1722 is set to "0" even though the odd symbol 1751 is included in the second part 1722. In addition, an identical CRV is set to a pair of symbols 1760 and 1761 included in the end 1720 of the circular buffer in which the wraparound occurs. Specifically, even though the even symbol 1760 included in a pair of symbols is included in the second part 1722, the same CRV value as the third part 1723 is set thereto.

Figure 18:
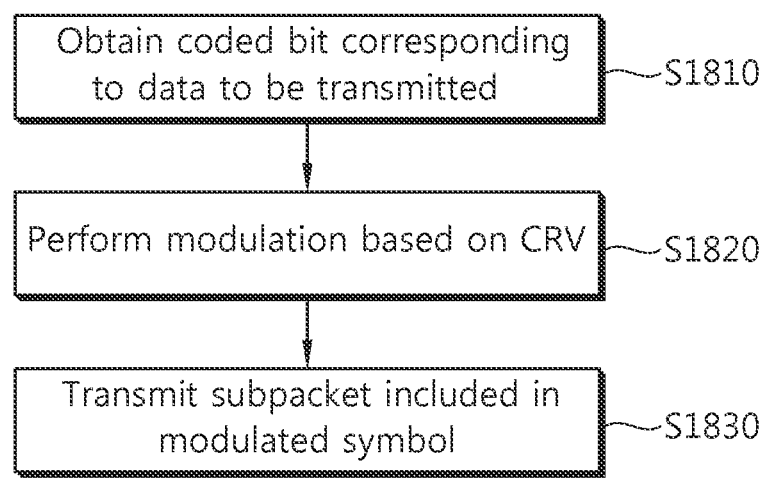
FIG. 18 shows an example of an operation according to the aforementioned embodiment.

FIG. 18 shows an example of an operation according to the aforementioned embodiment. An MS and/or a BS can perform the operation of FIG. 18 to use a UL or DL HARQ (e.g., CC or IR HARQ). Specifically, the MS can obtain a coded bit corresponding to transmitted data (step S1810). Coding includes channel coding. The channel coding can include turbo coding, convolution coding, and convolutional turbo coding.

Modulation (i.e., constellation mapping) is performed according to a CRV for the coded bit (step S1820). The coded bit can be input to a circular buffer and can be selected according to a starting position. For the selected bit, modulation is performed according to the CRV. A method of determining the CRV may be any one of Equations 5 to 8 and the aforementioned rule. Further, the starting position can be determined according to Equation 2 or Table 1. Furthermore, constellation mapping can follow Tables 2 and 3 above.

The CRV value can be signaled in various manners. For example, in the DL HARQ operation, the CRV can be indicated by control information such as DL Assignment A-MAP IE. In addition, in the UL HARQ operation, the CRV can be indicated according to a predetermined well-known method.

A modulated symbol is included in a sub-packet. The sub-packet is transmitted to a receiving side through at least one antenna (step S1830). If a NACK signal is received from the receiving side, a sub-packet generated by changing an SPID can be retransmitted. For example, in case of using the UL HARQ, the SPID can be changed in the order of 0, 1, 2, and 3. In addition, in case of using the DL HARQ, the SPID can be changed to generate a new sub-packet according to signaling from the BS.

4 sub-packets can be generated for one FEC block. That is, various sub-packets can be generated by selecting any one of four SPIDs, and can be used for HARQ initial transmission and retransmission. That is, the sub-packet can be generated in a unit of FEB block. Meanwhile, the HARQ operation can be performed in a unit of sub-packet generated in all FEC blocks instead of the unit of FEC block.

Figure 19:
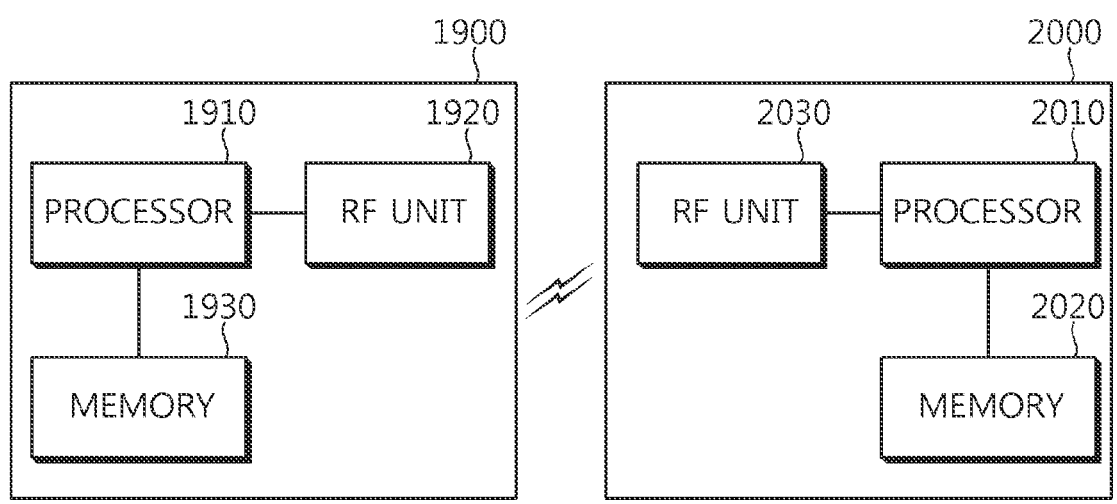
FIG. 19 shows a mobile station and a base station according to the aforementioned embodiment of the present invention.

FIG. 19 shows an MS/BS according to the aforementioned embodiment of the present invention. An MS 1900 includes a processor 1910, a memory 1930, and a radio frequency (RF) unit 1920. The processor 1910 can allocate a radio resource according to information provided from an external component or information pre-stored in an internal component. The processor 1910 can implement procedures, methods, and functions performed by the MS in the aforementioned embodiments. The memory 1930 coupled to the processor 1910 stores a variety of information for driving the processor 1910. The RF unit 1920 coupled to the processor 1910 transmits and/or receives a radio signal.

A BS 2000 includes a processor 2010, a memory 2020, and an RF unit 2030. The processor 2010 can implement procedures, methods, and functions performed by the BS in the aforementioned embodiments. The memory 2020 coupled to the processor 2010 stores a variety of information for driving the processor 2010. The RF unit 2030 coupled to the processor 2010 and transmits and/or receives a radio signal.

The processors 1910 and 2010 may include an application-specific integrated circuit (ASIC), a separate chipset, a logic circuit, and/or a data processing unit. The memories 1920 and 2020 may include a read-only memory (ROM), a random access memory (RAM), a flash memory, a memory card, a storage medium, and/or other equivalent storage devices. The RF units 1930 and 2030 may include a base-band circuit for processing a radio signal. When the embodiment of the present invention is implemented in software, the aforementioned methods can be implemented with a module (i.e., process, function, etc.) for performing the aforementioned functions. The module may be stored in the memories 1920 and 2020 and may be performed by the processors 1910 and 2010. The memories 1920 and 2020 may be located inside or outside the processors 1910 and 2010, and may be coupled to the processors 1910 and 2010 by using various well-known means.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A data processing method for hybrid automatic repeat request (HARQ) performed by a mobile station or a base station, the method comprising:

obtaining coded bits corresponding to data to be transmitted;

generating a sub-packet that includes a constellation symbol by applying a constellation mapping to a bit selected from the coded bits based on a starting point, the constellation mapping applied according to a constellation rearrangement version (CRV); and transmitting a signal corresponding to the sub-packet, wherein $CRV_{j,k}$ is a CRV of a $j^{th}$ constellation symbol included in a $k^{th}$ forward error correction (FEC) block that includes the sub-packet, and is defined by $$CRV_{j,k} = \left( CRV_{starting,k} + \left\lfloor \frac{\left\lfloor \frac{P_{i,k}/N_{mod}}{K_{RS}} \right\rfloor \cdot K_{RS} + n}{N_{FB\_Buffer,k}/N_{mod}} \right\rfloor \right) \mod 2,$$

wherein $\lfloor \bullet \rfloor$ indicates a floor function, 'mod' indicates a modulo operation, $CRV_{starting,k}$ indicates a starting value for the CRV, $P_{i,k}$ indicates the starting point, $N_{mod}$ indicates a modulation order, and $N_{FB\_Buffer,k}$ indicates a buffer size for the $k^{th}$ FEC block, wherein n is defined by $$n = \left( N_{QAM,k} - \left\lfloor \frac{SPID}{K_{RS}} \right\rfloor \cdot K_{RS} + j \right) \mod N_{QAM,k},$$

and wherein $N_{QAM,k}$ indicates a number of constellation symbols included in the $k^{th}$ FEC block, i and SPID indicate an identifier (ID) of the sub-packet, and $K_{RS}$ indicates a value that is set to '1' when a number of multiple input multiple output (MIMO) streams for the signal '1' and otherwise is set to '2'.

2. The method of claim 1, wherein the starting point is determined by a sub-packet ID of the sub-packet.

3. The method of claim 1, wherein:
the CRV is set to '1' or '0'; and
the starting value for the CRV is set to '1' or '0'.

4. The method of claim 1, wherein the constellation symbol is a 16-quadrature amplitude modulation (QAM) symbol or a 64-QAM symbol.

5. The method of claim 1, further comprising generating a new sub-packet based on a changed SPID.

6. The method of claim 1, wherein:
the constellation symbol is divided into an even symbol and an odd symbol if the number of MIMO streams is greater than or equal to '2'; and
a constellation mapping scheme applied to the even symbol is different from a constellation mapping scheme applied to the odd symbol.

7. The method of claim 6, wherein:
a CRV is determined equally for a first constellation symbol and a second constellation symbol that directly follows the first constellation symbol; and
the first constellation symbol is the even symbol and the second constellation symbol is the odd symbol.

8. The method of claim 1, wherein an even number of constellation symbols is included in the sub-packet.

9. The method of claim 1, wherein the HARQ comprises an incremental redundancy HARQ (IR-HARQ) scheme.

10. The method of claim 1, wherein the CRV is changed whenever a wraparound occurs at an end of a circular buffer associated with the SPID.

11. A mobile station for performing hybrid automatic repeat request (HARQ), comprising:
a processor configured for:
obtaining coded bits corresponding to data to be transmitted; and
generating a sub-packet that includes a constellation symbol by applying constellation mapping to a bit selected from the coded bits based on a starting point, the constellation mapping applied according to a constellation rearrangement version (CRV); and
a radio frequency (RF) unit configured for transmitting a signal corresponding to the sub-packet,
wherein $CRV_{j,k}$ is a CRV of a $j^{th}$ constellation symbol included in a $k^{th}$ forward error correction (FEC) block that includes the sub-packet, and is defined by $$CRV_{j,k} = \left(CRV_{starting,k} + \left\lfloor \frac{\left\lfloor \frac{P_{i,k}/N_{mod}}{K_{RS}} \right\rfloor \cdot K_{RS} + n}{N_{FB\_Buffer,k}/N_{mod}} \right\rfloor \right) \mod 2,$$

wherein $\lfloor \bullet \rfloor$ indicates a floor function, 'mod' indicates a modulo operation, $CRV_{starting,k}$ indicates a starting value for the CRV, $P_{i,k}$ indicates the starting point, $N_{mod}$ indicates a modulation order, and $N_{FB\_Buffer,k}$ indicates a buffer size for the $k^{th}$ FEC block, wherein n is defined by $$n = \left(N_{QAM,k} - \left\lfloor \frac{SPID}{K_{RS}} \right\rfloor \cdot K_{RS} + j\right) \mod N_{QAM,k},$$

and wherein $N_{QAM,k}$ indicates a number of constellation symbols included in the $k^{th}$ FEC block, i and SPID indicate an identifier (ID) of the sub-packet, and $K_{RS}$ indicates a value that is set to '1' when a number of multiple input multiple output (MIMO) streams for the signal is '1' and otherwise is set to '2'.

* * * * *